United States Patent [19]

Arendt

[11] 4,129,819
[45] Dec. 12, 1978

[54] VOLTAGE REGULATOR CIRCUIT FOR MOTOR VEHICLE GENERATOR WITH FEEDBACK TO OPPOSE REGULATOR TRANSIENTS

[75] Inventor: Armin Arendt, Munich, Germany

[73] Assignee: Robert Bosch GmbH, Stuttgart, Germany

[21] Appl. No.: 837,990

[22] Filed: Sep. 29, 1977

[30] Foreign Application Priority Data

Oct. 29, 1976 [DE] Fed. Rep. of Germany ....... 2649306

[51] Int. Cl.² .............................................. H02P 9/38
[52] U.S. Cl. ...................................... 322/28; 320/64; 322/73
[58] Field of Search .................. 322/28, 59, 72, 73; 320/64, 68; 323/22 T

[56] References Cited

U.S. PATENT DOCUMENTS

| | | | |
|---|---|---|---|
| 3,559,026 | 1/1971 | Nolan et al. | 320/68 X |
| 3,593,113 | 7/1971 | Wiley | 320/68 X |
| 3,602,796 | 8/1971 | Bleher | 322/28 |
| 3,775,666 | 11/1973 | Smith | 322/28 |

Primary Examiner—Robert J. Hickey
Attorney, Agent, or Firm—Flynn & Frishauf

[57] ABSTRACT a stiff positive feedback to the voltage regulator tap at which the Zener diode in circuit with the control transistor of the regulator is called into play accelerates the switching operation at the operating thresholds of the regulator, while a negative feedback from the same regulator terminal, with inversion produced by a transistor, is applied to a second tap of the voltage divider farther from ground, where its effect is delayed by a capacitor that also serves to filter the command voltage applied to the regulator. The transistor that inverts the feedback acts as a controlled current source drawing current from the second voltage tap. The circuit is highly compatible with production by integrated circuit technology.

9 Claims, 1 Drawing Figure

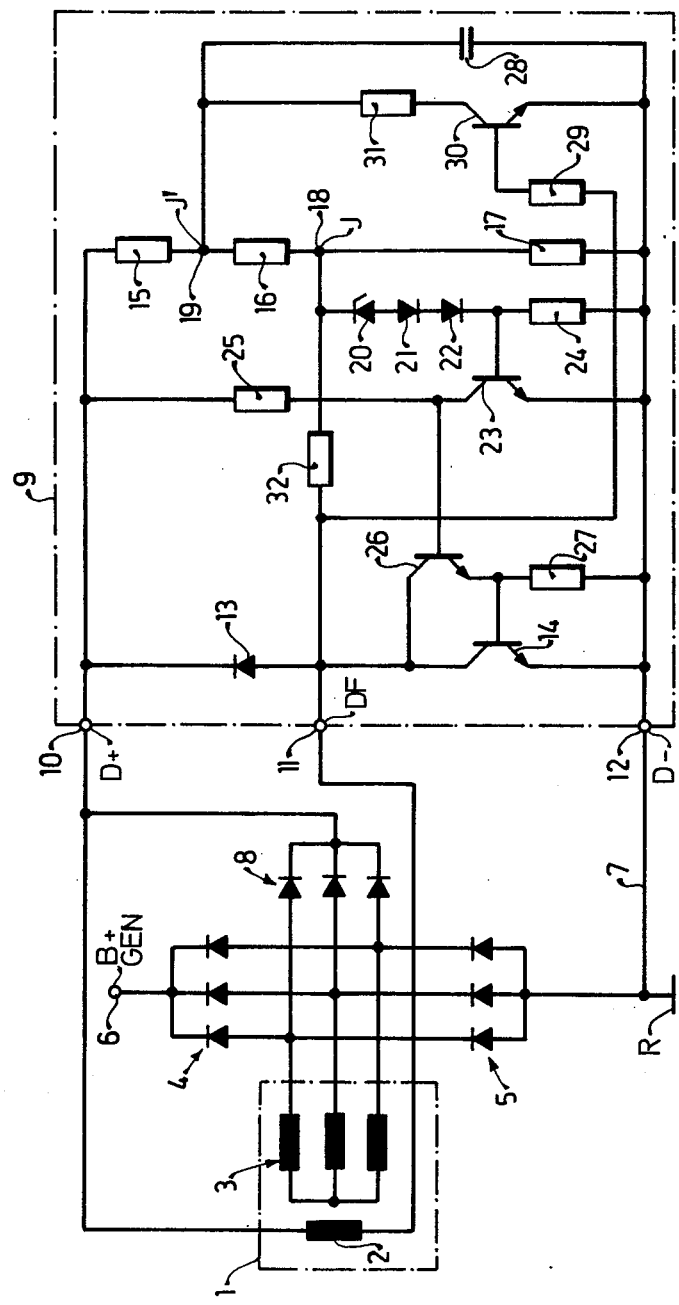

VOLTAGE REGULATOR CIRCUIT FOR MOTOR VEHICLE GENERATOR WITH FEEDBACK TO OPPOSE REGULATOR TRANSIENTS

REFERENCE TO RELATED APPLICATION:

U.S. Ser. No. 834,000, filed Sept. 16, 1977, ARENDT, claiming priority of German application No. P 26 44 643.5 filed Oct. 2, 1976.

The present invention relates to a voltage regulator and more particularly to an automotive type voltage regulator to control the on-board voltage of a vehicular electrical network.

BACKGROUND AND PRIOR ART

The provision of voltage regulators is well known for generators that develop a voltage dependent both on exciter field current and the generator speed and are used in a service in which the speed continually changes, as for example in motor vehicles. In the known regulators the current through the exciter field winding of the generator is controlled by a switching transistor of which the base electrode is generally connected through a Zener diode to a voltage divider that is, in turn, connected across the exciter field voltage or across the battery voltage of the vehicle. If the voltage at the voltage divider exceeds the value at which the Zener diode begins to conduct in the breakdown mode, the switching transistor is blocked and the current through the exciter field winding drops off. If the voltage at the voltage divider drops back below a value that is no longer sufficient for the Zener diode to conduct, the switching transistor is again put into its conducting condition and the exciter field current rises again. In this manner, a two-position regulator is provided that nevertheless only operates within a certain hysteresis and does not regulate continuously.

In order to improve the behavior of the voltage regulator it is known to use the combination of one or more switching transistors and one or more control transistors instead of a single switching transistor. The operation characteristic of a regulating amplifier so provided can be further improved by various forms of feedback.

From British Pat. No. 979,415 a voltage regulator is known in which a control transistor controls a switching transistor. In this case the output of the switching transistor is fed back by means of an RC network to the base of the control transistor. The base of the control transistor is connected in the manner described above, through a Zener diode, with the tap of a voltage divider. If the Zener diode is put into its conducting condition, the feedback from the switching transistor to the control transistor by the RC network has the effect of making the regulating amplifier unstable. Relaxation oscillations then take place in which the regulating amplifier switches over from a condition in which the control transistor conducts and the switching transistor is blocked to another condition, in which the control transistor is blocked and the switching transistor conducts at a frequency that is determined by the RC network. The keying ratio of this relaxation oscillation, i.e. the ratio to the oscillation period of the duration of the condition in which the switching transistor conducts, is determined by the current through the Zener diode. In this manner a continuously operating self-oscillating two-point regulator is produced from the two-point regulator above discussed. Although this method produces a raised regulation speed, particularly at lower generator speeds at which without the described feedback a flickering of the charge control lamp would take place, nevertheless, as a result of the continual switching back and forth, voltage jumps are produced that undesirably widen the switching hysteresis.

In British Pat. No. 1,205,421 another voltage regulator is disclosed in which in addition to the above described feedback through an RC network, another stiff feedback is used. In this case the switching transistor is current-coupled through an emitter resistor and the voltage at the emitter of the switching transistor is fed back through another resistor to the base of the control transistor, which in turn is connected through a Zener diode with the tap of a voltage divider. The feedback from the collector of the switching transistor through an RC network to the base of the control transistor here operates as a delayed positive feedback, while the feedback from the emitter of the switching transistor through a resistor to the base of the control transistor operates as stiff inverse feedback. Stabilization of the regulating amplifier is obtained by the stiff negative feedback, particularly against variations in the amplification factors of the transistors and variations of the operating parameters of the regulator, without, however, regulating out the distributing switching transients.

A voltage regulator was disclosed in German published patent application (OS) No. 1,613,983 in which the voltage divider is connected across the exciter field winding and is provided with an additional tap, to which a capacitor is connected, of which the other terminal is connected to ground or chassis. the first tap of the voltage divider is connected in the usual way through a Zener diode to the control transistor. The collector of the switching transistor, furthermore is connected through a resistor with the first tap of the voltage divider, i.e. the regulating amplifier has a stiff positive feedback. In addition, for compensation of temperature effects two diodes are connected in series with the Zener diode. By the connection of the capacitor between the additional tap of the voltage divider and chassis ground a smoothing of the command voltage of the regulator is obtained. The regulator is thus constituted as a two-point regulator with two discrete switching conditions.

THE PRESENT INVENTION

It is an object of the present invention to provide a regulator for the generator of a vehicle electrical system which will not be subject to the disadvantages of the prior devices and, in particular, which will overcome the deterioration in regulation provided by the presence of switching transients, without giving up the simplicity and convenience of the basic two-point regulator.

Briefly, the voltage regulator is provided with an inverse feedback path having a delayed operation characteristic and connected between the connection of the semiconductor switch to the exciter field winding and a second tap of the voltage divider. The inverse feedback path, moreover, is constituted as a controlled current source and has a capacitor as a delay producing component that also serves to smooth the command voltage of the regulator. The voltage regulator also preferably has a feedback path, preferably consisting essentially of a resistor, connected between the connection of the switching transistor of the exciter field winding and the usual first tap of the voltage divider, to which the control transistor that controls a swithcing transistor is connected in the usual way through a Zener diode. For temperature compensation, at least one diode is provided in series with the Zener diode, so poled as to be conducting when the Zener diode conducts in its breakdown mode.

The command voltage applied to the voltage divider may be the battery voltage, but in the case where a separate set of diodes is provided for rectifying the alternating current generator output for supply of a dc voltage to the exciter field winding, the latter dc voltage can conveniently be the command voltage for the voltage divider of the regulator.

The voltage regulator according to the invention is a self-oscillating continuously operating two-point regulator that, furthermore, regulates out the transients produced by the diodes. Its components are of such magnitude that the regulator circuit can lend itself to production in the form of an integrated circuit. The use as a delay element for the negative feedback path of a smoothing capacitor such as is normally utilized for filtering the command voltage at the tap of the voltage divider to which the Zener diode is connected results in saving of the cost of an additional component.

The drawing, annexed hereto, shows in its single FIGURE a circuit diagram of an illustrative example of a voltage regulator for a motor vehicle generator in accordance with the invention, together with the generator and rectifier with which it operates.

In the illustrated example the generator is a three-phase alternator 1 having an exciter field winding 2 and stator windings 3, connected to a three-phase bridge rectifier. The three-phase bridge rectifier consists of positive side diodes 4 and negative side diodes 5. The positive side diodes 4 have their cathodes connected to a positive terminal 6, generally designated B+ in automotive practice, to which the battery charging circuit and, in general, the load on the generator is usually connected. The negative side diodes 5 have their anodes connected to the chassis ground connection 7 that is, generally speaking a reference potential and therefore is designated R. Additional exciter circuit circuits diodes 8 are provided that have their anodes connected to the respective alternating current outputs of the three-phase generator 1. For regulating the rectified output voltage of the three-phase generator 1 that appears at the positive terminal 6, a voltage regulator 9 is provided that has a first input terminal 10, a second input terminal 11 and a third input terminal 12. The first input terminal 10 — in automotive parlance D+ — is connected to the cathodes of the exciter circuit diodes 8 and to the exciter field winding 2. The second input terminal — DF in shop talk — is connected to the other end of the exciter field winding 2. The third input terminal — commonly designated D − − is connected to the chassis ground 7. In parallel to the exciter field winding 2 a diode 13 is connected between the first input terminal 10 and the second input terminal 11. Between the second input terminal 11 and third input terminal 12 is connected the collector-emitter path of a switching transistor 14. Between the first input terminal 10 and the third input terminal 12 of the regulator 9, i.e. between the field excitation voltage and ground, the voltage divider is also connected that consists of the resistors 15, 16 and 17. The voltage divider provides a first tap 18 and a second tap 19 for the circuit. Between the first voltage divider tap 18 and the base of a control transistor 23 are connected in series a Zener diode poled in its blocking direction, and two diodes 21 and 22 poled in their conducting direction and connected in series with a Zener diode 20. The control transistor 23 has its base electrode connected to ground through a base resistance 24 and its collector electrode connected to the exciter field supply voltage through a collector resistor 25. The collector of the control transistor is connected to the base of a transistor 26 of which the emitter-collector path is connected in parallel with the collector-base path of the swithcing transistor 14. The emitter of the transistor 26 is connected to the base of the switching transistor 14 and also through a base resistor 27 to chassis ground.

A circuit path consisting of the resistor 32 leads from the second input terminal 11 of the voltage regulator to the first voltage divider tap 18. A second circuit path consisting of a transistor 29 leads likewise from the second input terminal 11 to the base of a transistor 30. The emitter of the transistor 30 is connected to chassis ground and its collector is connected through a resistor 31 to the second tap 19 of the voltage divider. Between the second tap 19 of the voltage divider and ground there is, in addition, connected a smoothing capacitor 28.

The three-phase alternator 1 that is driven by the engine of a motor vehicle, delivers an alternating current to the rectifier, from the positive terminal 6 of which an output dc voltage relative to chassis ground can be obtained. The positive terminal 6 is connected with the positive pole of a motor vehicle battery not shown in the drawing and from that connection on supplies electricity to the various portions of the electrical system of the motor vehicle.

The dc output voltage of the excitation field circuit diodes 8 appears at the first input terminal 10 of the voltage regulator 9. The excitation field winding 2 of the alternator 1 is connected to the first input terminal 10 and to the second input terminal 11 of the voltage regulator 9. Between the second input terminal 11 and the third input terminal 12 of the voltage regulator is the switching path of the switching transistor 14. Hence the current through the exciter field winding 2 which must flow from the first input terminal 10 of the regulator through the winding 2 towards ground can be throttled by the swithcing transistor 14. In the illustrated example the command variable for the voltage regulator 9 is the voltage at the common terminal of the exciter circuit diodes 8. Between the point at which this voltage appears and ground there is connected a voltage divider from the first tap 18 of which there is a circuit path through the Zener diode 20 to the base of the control transistor 23. The transistor 26 and the switching transistor 14 are connected in cascade and are controlled by the control transistor 23 in such a way that the switching transistor 14 conducts when the control transistor 23 is blocked and the switching transitor 14 is blocked when the control transistor 23 conducts. Without taking account of the feedback paths respectively through the resistor 32 and through the resistor 29, the transistor 30 and the resistor 31, the regulator would operate as follows: a current flows through the resistor 25 into the transistor 26 which then puts the transistor 14 into its conducting condition. A current therefore flows through the exciter field winding 2 of the alternator 1. If the alternator 1 is driven by a vehicle engine, its outputs voltage increases, because the output voltage of a generator is approximately proportional to the product of speed and exciter field current. With increasing output voltage of the alternator 1 the dc voltage at the positive terminal 6 likewise rises as well as the dc voltage at the cathodes of the exciter diodes 8, i.e. at the first input terminal 10 of the regulator. An increasing current then flows through the voltage divider that consists of the resistor cover causing the potential of the first tap 18 of the voltage divider to likewise rise. Once the first tap has reached a certain voltage with respect to ground, the breakdown voltage of the Zener diode 20 is also reached and the current flows through the temperature compensating diodes 21 and 22 in the base of the control transistor 23. The latter is thereby put into its conducting condition and accordingly blocks the switching transistor 14 in the above described way. The current through the exciter field winding then drops and with it the output voltage of the alternator 1. With reduction of the dc voltage at the first input terminal 10 of the regulator and thus at the first tap 18 of the voltage divider, a voltage value is reached at which the Zener diode 20 goes back into the non-conducting condition. The control transistor then stops conducting and the switching transistor goes into action. The voltage regulator 9 thereby has the behavior of a two-point regulator in which the voltage values at which it switches are determined by the characteristics of the Zener diode 20.

By the provision of a first feedback path the regulation characteristic of the voltage regulator 9 can be changed. The resistor 32 is connected between the second input terminal 11 and the first voltage regulator tap 18. The resistance 32 operates as a stiff positive feedback, because it for example transfers a voltage rise at the second input terminal 11, which corresponds to a blocking of the switching transistor 14, over to the base of the control transistor 23 and brings the latter transistor thereby still further into the conducting condition. The stiff positive feedback through the resistor 32 accordingly provides one of the respective switching operations that take place when the limits of the two-point regulator are reached.

The second feedback path connects the second input terminal 11 of the regulator through the resistor 29 to the base of the transistor 30, which has its emitter connected to chassis ground and its collector connected through the resistor 31 with the second tap 19 of the voltage divider. This feedback operates as a delayed inverse feedback and supplies an instability factor to the operation of the regulating amplifier. If, for example, the switching transistor 14 is put into its blocked condition, the potential at the second input terminal 11 of the regulator rises. The voltage at the base of the transistor 30 then also rises and the transistor 30 begins to conduct. When the transistor 30 is turned on, current is drawn from the second tap 19 of the voltage divider through the resistor 31, and this current, becuase of the smoothing capacitor 28 connected in parallel, has an exponentially rising course. The potential second tap 19 of the voltage divider then drops and the Zener diode 20 can again fall into the non-conducting condition, to the extent that the rest current through the Zener diode 20 was small enough. This means that the regulating amplifier has a self-oscillation of which the frequency is determined by the time constant that is produced by the network consisting of the smoothing capacitor 28 and the resistances 31, 15, 16, and 17. The two-point regulator with the two discrete switching conditions "on" and "off" is thus converted into a continually operating self-oscillating two-point regulator. The upper limit for the self-oscillation is then reached when the current through the Zener diode 20 is so great that the current drawn away through the resistor 31 and the transistor 20 are no longer able to bring the Zener diode 20 into the blocked condition.

A further substantial advantage of the voltage regulator of the present invention is that a substitute distributing mangitude is switched over to the regulator through the transistor 30. If one for example regards the time course of the voltage at the excitation circuit diodes 8, voltage jumps can be observed that are a consequence of the sudden changes in current caused by the switching and practically represent the change of the voltage drop of the rectifier diodes in the excitation circuit. If the voltage at the excitation circuit diodes 8, as in the illustrated example, are used as the command voltage for the regulator, the just described voltage jumps can noticeably disturb the regulation characteristic. Since the disturbing magnitude is superimposed upon the command voltage, no help can be provided through an improvement of the regulating amplifier and instead there must be a switching over of the disturbing magnitudes to the regulating amplifier. Since the disturbing magnitudes can be detected only with difficult by measuring methods at the first input terminal 10 of the voltage regulator 9, the voltage at the second input terminal 11 is used and provides a substitute disturbing magnitude through the feedback path containing the transistor 30 and presents it to the regulator at the second tap of the voltage divider. The smoothing capacitor 28 that is in any event present for filtering the exciter field voltage is then utilized at the same time for delay of the negative feedback. Since the inverse feedback is produced by a transistor connected as a controlled current source, the circuit of the voltage regulator as a whole can to a large extent be produced by integrated circuit technology.

The voltage regulator according to the invention can of course be used also in systems in which the command voltage is the voltage at the vehicle battery instead of the exciter field voltage. Even then the voltage regulator according to the invention operates as a self-oscillating, continuous two-point regulator the keying ratio (duty cycle) of which is so set that the arithmetic mean of the current through the exciter field winding 2 corresponds to the desired voltage value at the positive terminal 6.

The following in an illustrative table of values for the capacitor 28, the resistors, and so on of the regulator circuit 9 that has been found suitable for service with a three-phase alternator used for charging a vehicle battery in a twelve volt vehicle electrical system.

| COMPONENTS | ELECTRICAL VALUES |
|---|---|
| Capacitor 28 | AμF |
| Resistors: | |
| 15 | 560 Ω |
| 16 | 470 Ω |
| 17 | A.8 kΩ |
| 24 | 560 Ω |
| 25 | 9A0 Ω |
| 27 | A50 Ω |
| 29 | 820 kΩ |
| 31 | 22 kΩ |
| 32 | 82 kΩ |

| SEMICONDUCTORS | TYPES |
|---|---|
| Diode 13 | BOSCH AA-GH |
| Transistor 14 | RCA 2N3055 |
| Zener diode 20 | |

-continued

| SEMICONDUCTORS | TYPES |
| --- | --- |
| Diodes 21 and 22 | BOSCH AA-GH |
| Transistor 23 | Texas 2N3705 |
| Transistor 26 | Texas 2N3705 |
| Transistor 30 | (integrated) |

Various changes and modifications may be made within the scope of the inventive concept

I claim:

1. A voltage regulator for a generator having an exciter field winding (2) connected in series with a semiconductor switch (14) controllable through a Zener diode (20) by the voltage at a first tap (18) of a voltage divider (15, 16, 17) connected across the voltage to be regulated, in which regulator there is also provided: an inverse feedback path (28, 29, 30, 31) having a delayed operation characteristic and connected between the connection of the semiconductor switch (14) to said exciter field winding (2) and a second tap (19) of said voltage divider.

2. A voltage regulator as defined in claim 1 in which said semiconductor switch (14) is a switching transistor, and in which a control transistor (23) is provided for controlling said switching transistor (14), the base electrode of said control transistor (23) being connected in circuit with said Zener diode (20) and said first tap (18) of said voltage divider (15, 16, 17).

3. A voltage regulator as defined in claim 2 in which said base electrode of said control transistor (23) is connected through at least one temperature compensating diode (21, 22) to said Zener diode (20), each said temperature compensating diode being so poled so as to be conducting when said Zener diode (20) is conducting in its breakdown mode.

4. A voltage regulator is defined as claim 2 in which said inverse feedback path is constituted as a controlled current source (29, 30, 31).

5. A voltage regulator as defined in claim 4 in which said inverse feedback path has a smoothing capacitor (28) as a delay producing component.

6. A voltage regulator as defined in claim 2 in which a positive feedback path (32) is connected between the connection of said switching transistor (14) to said exciter field winding (2) and said first tap (18) of said voltage divider (15, 16, 17).

7. A voltage regulator as defined in claim 6 in which said positive feedback path consists essentially of a resistance (32).

8. A voltage regulator as defined in claim 1 for an alternating current generator having a set of diodes (8) for providing a rectified dc supply voltage to said exciter field winding (2) and in which said voltage to be regulated is said rectified dc voltage as supplied by said diodes (8).

9. A voltage regulator as defined in claim 1 in which said voltage to be regulated is the voltage of a storage battery connected to said generator to be charged thereby.

* * * * *